July 26, 1960 L. R. YESKE 2,946,171
ADJUSTABLE MOUNTING MEANS FOR A RECIPROCATING MOWER
Filed May 1, 1957
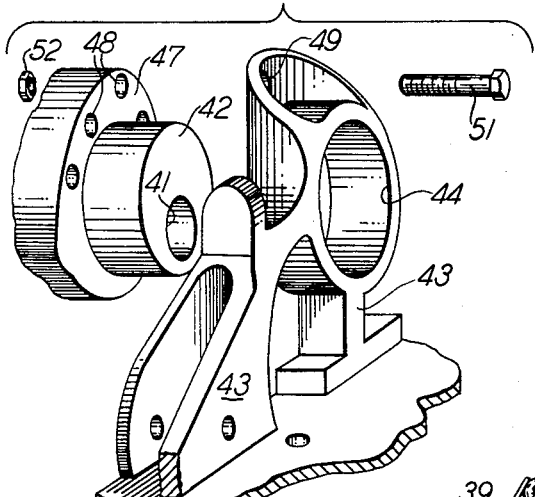
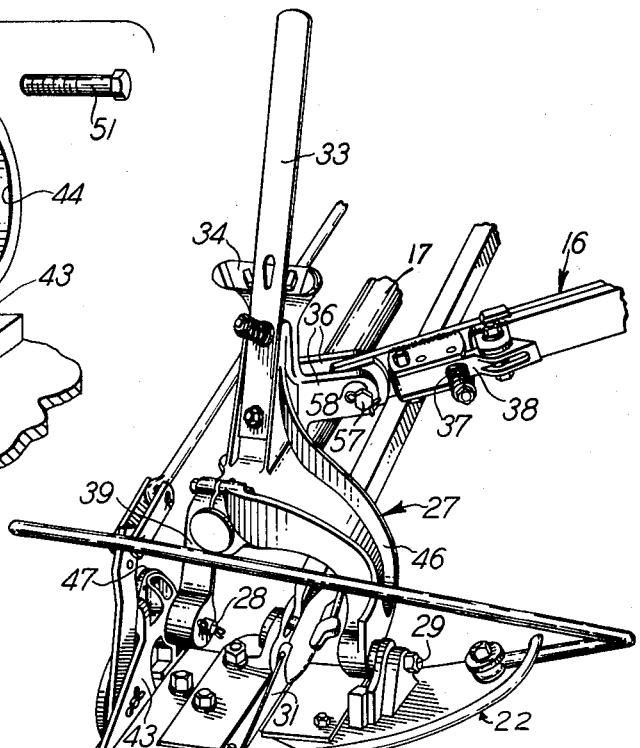
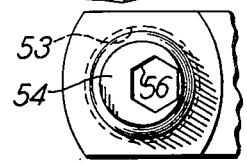
INVENTOR:
LAUREL R. YESKE
BY: Emerson B Donnell
ATTORNEY

United States Patent Office 2,946,171
Patented July 26, 1960

2,946,171

ADJUSTABLE MOUNTING MEANS FOR A RECIPROCATING MOWER

Laurel R. Yeske, Loves Park, Ill., assignor to J. I. Case Company, Racine, Wis., a corporation of Wisconsin Filed May 1, 1957, Ser. No. 656,362

1 Claim. (Cl. 56—25)

This invention relates to an agricultural mower, and, more specifically it relates to the adjustment of the mower cutter bar.

It is common knowledge that mower cutter bars, of the type mounted on the rear end of a tractor, should be disposed at approximately a ninety-degree angle to the longitudinal direction of the tractor. Because of manufacturing tolerances, flexibility, wear, and other factors influencing the positions of the parts, adjustment means is commonly provided on a mower to insure the proper cutting angle mentioned. It is also important that the mower cutter bar and pitman always be in a straight line to increase the life of the cutting parts and give smooth operation.

It is an object of this invention to provide improved adjustment means for accomplishing the desired conditions mentioned above.

Another object of this invention is to provide a mower adjustment means which is simple to manufacture and to operate, and which is reliable in the operation of the mower.

Still another object of this invention is to provide means for the mower adjustments mentioned with said means providing for the adjustment of the mower cutter bar to give the desired lead or ninety-degree setting without disturbing the alignment between the cutter bar and the pitman.

Other objects and advantages will become apparent upon reading the following description in conjunction with the accompanying drawings, wherein:

Fig. 1 is a diagrammatic view of a tractor and a mower attached thereto.

Fig. 2 is an enlarged perspective view of a fragment of a mower incorporating this invention.

Fig. 3 is an enlarged side elevational view of the rear end of the pull bar shown in Fig. 2.

Fig. 4 is an enlarged and exploded perspective view of certain parts shown in Fig. 2 partly in section.

The same reference numerals refer to the same parts throughout the four views.

Fig. 1 shows in a diagrammatic manner a conventional tractor 10 with the power take-off shield 11, tractor hitch arms 12 and 12a, and mower frame plate 13 all attached at the rear end of the tractor. Also, the mower 14 is attached to the tractor through a pull bar 16 and a conventional drag bar 17 to the frame plate at the swivel 18. A conventional pitman 19 is attached at the usual crank pin connection 20 to attach to a cutter bar 21. The usual inner shoe 22 and outer shoe 23 and grass rods 24 and 26 are also shown.

Continuing with the general description, Fig. 2 shows the inner shoe 22 with the usual hinge 27 attached to the drag bar 17 and supporting a pin 28 and a bolt 29 with the two axially aligned to serve as a horizontal pivot axis for the cutter bar 21. Thus, the pin and the bolt attach the cutter bar to the hinge 27 so that the cutter bar can float or pivot vertically at its outer shoe 23, all in the usual manner. It will also be noticed that the pitman 19 is attached to the knife head 31 such that operation of the pitman will cause the knife 32 to reciprocate over the cutter bar in the usual manner. Further, the usual tilt lever 33 is shown attached to the hinge 27 to effect the desired tilt of the cutter bar by positioning the lever in a selected position on the tilt quadrant 34. In a manner more fully explained later, the rear end of the pull bar 16 is connected to two pivot brackets 36 on the tilt quadrant. Between the drag bar and the pull bar connections, the quadrant is held in a fixed upright position on the drag bar while the hinge 27 can be pivoted about the drag bar by operation of the lever as is common. Still another conventional feature is that the pull bar 16 is of the double bar extensible type with the usual spring 37 yieldingly retaining a latch 38 whose release permits the bar to reach its full length as the cutter bar pivots rearwardly about the swivel connections 18 and 20.

The important features of this invention reside in the provision of an adjusting means in both the shoe 22 and the end of the pull bar 16. In this regard, Figs. 2 and 4 show the shoe eccentric which provides the adjustment at that point. The rear leg 39 of the hinge 27 carries the pin 28 which also passes through an opening 41 shown eccentrically disposed in a cylindrical boss or eccentric 42 in Fig. 4. The rear end of the shoe 22 includes a bracket 43 which contains a circular opening 44 for reception of the boss 42. It will thus be understood that the cutter bar 21, being attached to the shoe 22, will be pivotal about the axis of the pin 28 as the entire shoe and the bracket and the boss pivot about the axis of the pin 28. The front leg 46 of the hinge 27 attaches to the shoe 22 through the bolt 29 and a ball connection not fully shown but of the usual design in the front portion of shoe 22. The ball connection allows for universal movement of the shoe and the cutter bar about the point of its location. Such design is disclosed in the United States patent to Sharpe, 760,707.

Fig. 4 also shows the eccentric 42 to have a flange 47 with a plurality of bolt openings 48 spaced therearound. The bracket 43 contains a bolt opening 49 which aligns with any selected one of the openings 48 when the eccentric 42 is disposed in the opening 44 and assembled as in Fig. 2. A bolt 51 can then be passed through the aligned holes 48 and 49 and a nut 52 will secure the bolt which in turn will secure the eccentric 42 in a selected rotated position in the opening 44. It will thus be understood that because of the ecentric 42, the position of the bracket 43 will be determined by the setting of the eccentric 42.

The eccentric 42 and its cooperating parts can be considered to be the first means for adjusting the position of the cutter bar 21 with respect to the pitman 19. To assure good operation and long cutter life, it is important that the pitman 19 and the cutter bar 21 be aligned. This alignment is accomplished by adjustment of the eccentric 42. Thus, removal of the bolt 51 will permit the eccentric 42 to be rotated in the opening 44 about the pin 28 to swing the cutter bar into a desired position with respect to the pitman.

A second means for adjusting the cutter bar 21 is disposed at the end of the pull bar 16. Fig. 3 shows the bar 16 to contain a circular opening 53 which receives a ball-like bearing 54 having portions having flat faces or surfaces which are parallel which fit flush between the brackets 36. The ball 54 contains an eccentric hexagonal opening 56 which receives a hexagonal pin 57. The latter passes through a hexagonal opening 58 in the brackets 36 and is thus maintained in a selected rotated position by the brackets 36. Each of the brackets 36 is provided with a hexagonal opening 58 for reception of the pin 57 which snugly extends through the hexagonal opening 56 in the ball 54.

It will thus be apparent that removal of the pin 57 from the ball and the brackets will permit the ball to be rotated in the opening 53 so that the position of the eccentric opening 56 is changed. The pin 57 can then be replaced to connect the pull bar 16 to the brackets 36 and the ball will be retained in its rotated position. This adjustment alters the effective length of the pull bar 16 and thus pivots the cutter bar about the swivel 18. Such adjustment is important to set the desired lead in the cutter bar position to where the outer shoe 23 is advanced slightly so that cutting operation will cause the cutter bar to be disposed at the desired ninety-degree relation to the tractor. As mentioned, the flexibility of the parts, tolerances, wear, etc., become apparent under the grass resistance of mowing and the cutter bar lead disappears.

Fig. 1 shows a center line 59 which is ninety degrees to the tractor and set by the first adjusting means. The center line 61 shows the cutter bar lead set by the second adjusting means. Since the actual lead is only a slight amount, the eccentric means described has been found to be sufficient and extremely accurate in setting the cutter bar.

While a specific embodiment of this invention has been shown and described, it should be obvious that certain changes could be made, and the invention should, therefore, be limited only by the appended claim.

What is claimed is:

In an agricultural mower comprising, a frame means adapted to be mounted adjacent the rear end of a tractor, a drag bar swivelly attached at one end to said frame means and disposed transversely thereof, a pitman operatively associated with said frame means and disposed transversely thereof, a cutting assembly pivotally connected at its inner end to the free end of said drag bar, said pitman being connected to said cutting assembly for operating the latter, in combination, a pull bar extending between said tractor and said cutting means, comprising a longitudinal member adapted to be flexibly connected at one end to said tractor and connected at its other end to the inner end of said cutting means, and means connecting said other end to said inner end of said cutting means comprising spaced brackets on said inner end of said cutting means extending generally in the direction of said pull bar and receiving between them said other end of said pull bar, a ball journaled in said other end of said pull bar between said brackets and providing an opening therein displaced from an axis of said ball and having a polygonal cross section, said brackets providing an opening of similar polygonal cross section disposed transverse to the direction of said elongated member, a pin of a cross section complementary to that of said openings and engaged in said openings, and means retaining said pin against displacement from said openings, whereby said ball may be retained in a plurality of rotated positions to adjust the effective length of said elongated member and whereby said elongated member may swing, at least to a limited extent, in any direction about said ball.

References Cited in the file of this patent

UNITED STATES PATENTS

| | | |
|---|---|---|
| 681,950 | Clark | Sept. 3, 1901 |
| 760,707 | Sharp | May 24, 1904 |
| 943,266 | Pelton | Dec. 14, 1909 |
| 2,155,716 | Korsmo et al. | Apr. 25, 1939 |
| 2,580,266 | Abgarian | Dec. 25, 1951 |
| 2,743,568 | Elfes | May 1, 1956 |
| 2,779,145 | Smith | Jan. 29, 1957 |
| 2,793,483 | Johnson et al. | May 28, 1957 |